Nov. 25, 1958     I. NESSON     2,861,289
WINDSHIELD WIPER BLADE
Filed Feb. 16, 1955
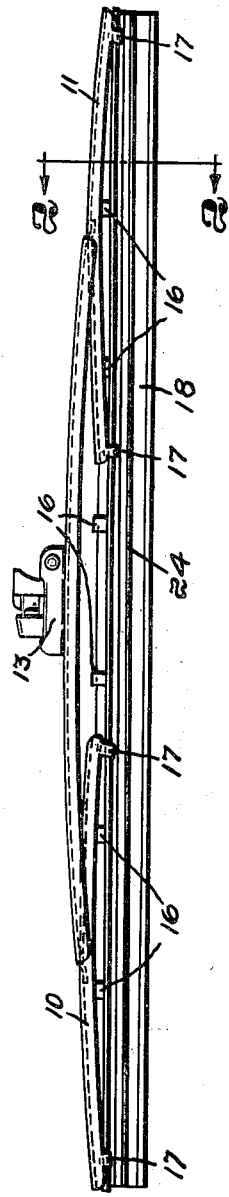
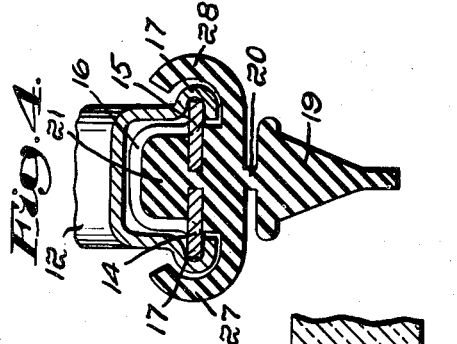
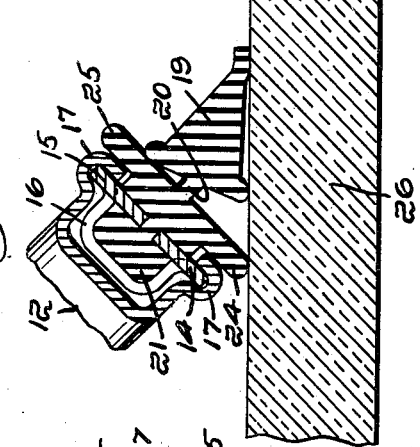
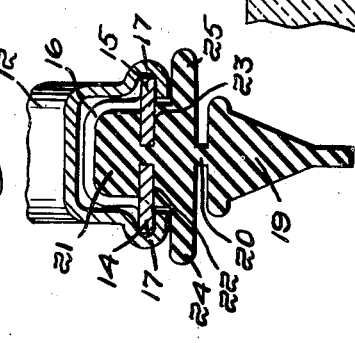
Inventor:
Israel Nesson,
by Arthur D. Thomson
Attorney & 2,861,289
Patented Nov. 25, 1958

2,861,289

WINDSHIELD WIPER BLADE

Israel Nesson, Lynn, Mass., assignor to
Max Zaiger, Swampscott, Mass.

Application February 16, 1955, Serial No. 488,480

6 Claims. (Cl. 15—245)

This invention relates to flexible wiper blades for automobile windshields and pertains more particularly to improvements in the type of blade consisting of a wiper strip attached to a flexible metal backer strip, the edges of which are slidably engaged by saddle members or yokes which form part of the blade holder, as shown, for example, in my co-pending application Serial No. 361,697, filed June 15, 1953, now abandoned.

The principal object of this invention is to provide means for shielding the edges of the saddle members so that they do not scratch the glass when the blade and holder are disposed at an acute angle to the windshield, as frequently happens when the blade tilts at the end of its reciprocating movements, and particularly when the glass is dry or dirty. Other objects are to accomplish this result at a minimum of expense and without complicating the assembly of the windshield wiper.

In the drawings illustrating the invention:

Fig. 1 is a side view of a windshield wiper constructed according to the invention;

Fig. 2 is an enlarged cross-section, partly broken away, along line 2—2 of Fig. 1;

Fig. 3 is a similar cross-section showing the wiper as it would appear in operation when disposed at an acute angle to a windshield; and Fig. 4 is a cross-section similar to Fig. 2, showing a modified form of the blade.

The blade holder is of conventional construction and consists of a pair of yokes 10 and 11 pivotally connected at their centers to the ends of a central yoke 12, to distribute the pressure of the wiper arm along the blade. The yoke 12 carries a clip 13 for attachment to a windshield wiper arm. The blade backer is of the type described in my aforesaid copending application, consisting of a pair of flexible strips 14 and 15 rigidly connected together at intervals by bridging members 16. The yokes 10 and 11 are channel or saddle shaped and have pairs of fingers 17 disposed near their ends and bent around the outer edges of the strips 14 and 15 to form a sliding connection between the holder yokes and the blade.

The wiper strip, generally indicated by the numeral 18, is ordinarily made of extruded or molded rubber, and has a head 19 connected, by a reduced neck 20, to a body portion 21 having longitudinal edge grooves 22 and 23 in which the inner margins of strips 14 and 15 are engaged.

In the form shown in Fig. 2, the body portion 21 of the wiper strip has sidewardly projecting flanges 24 and 25 along both its sides. These flanges underlie and project beyond the fingers 17 of the holder yokes. As shown in Fig. 3, when the wiper holder is disposed at an acute angle with respect to the windshield (a portion of which is illustrated and indicated by the numeral 26) the flange nearest the windshield, in this case flange 24, is interposed between the glass and the fingers 17 on that side of the yoke. Flange 25 acts in the same way when the wiper holder is tilted in the other direction.

In the form shown in Fig. 4, the body 21 of the wiper strip has upwardly curved lips 27 and 28 which project out and up around the edges of the backer strips and partly enclose the fingers 17. These lips function in about the same manner as flanges 24 and 25 to keep the fingers from striking the glass. In both the forms shown, the protecting members can be very easily molded as part of the wiper strip, and add very little to the cost of material. The wiper strip can be slid on to the backer as described in said application.

In both illustrated embodiments of the invention the flanges 24, 25 or 27, 28 of the rubber wiper strip provide buffers or shields which underlie the fingers or clips of the yoke saddles, and effectively prevent contact between those fingers and the surface of the windshield.

I claim:

1. A windshield wiper blade assembly comprising a flat flexible backer having longitudinal outer edges, a yoke having fingers slidably engaging said edges, and a wiper strip connected to the backer, said strip having sidewardly projecting flanges underlying said backer and fingers running longitudinally along the entire blade, said flanges having free longitudinal outer edges disposed outward of said backer and said fingers, and the flanges being of sufficient rigidity to maintain said fingers and backer edges in spaced relationship to a windshield when the backer is disposed at an acute angle to the windshield, and the strip having a portion to which said flanges are joined which seats against said backer and prevents tilting of the flanges with respect to said backer.

2. A wiper blade assembly as described in claim 1, the sidewardly projecting flanges having curved lips running the entire length of the wiper strip body and partially surrounding said fingers.

3. A wiper blade assembly as described in claim 1, the sidewardly projecting flanges being flat members projecting sidewise beyond the fingers.

4. A windshield wiper blade assembly comprising a flat flexible backer having longitudinal outer edges, a yoke having fingers slidably engaging said edges, and a wiper strip connected to the backer, said strip having sidewardly projecting flanges underlying said backer and fingers and running longitudinally under the fingers, said flanges having free longitudinal outer edges disposed outward of said backer, and the flanges being of sufficient rigidity to maintain said fingers in spaced relationship to a windshield when the backer is disposed at an acute angle to the windshield, and the strip having a portion to which said flanges are joined which seats against said backer and prevents tilting of the flanges with respect to said backer.

5. A windshield wiper blade assembly as described in claim 4, said flanges being substantially flat.

6. A windshield wiper blade assembly as described in claim 4, said flanges having curved lips partially surrounding said fingers.

References Cited in the file of this patent

UNITED STATES PATENTS

| 1,615,915 | Ridge | Feb. 1, 1927 |
| 1,853,715 | Anderson | Apr. 12, 1932 |
| 2,700,785 | Oishei et al. | Feb. 1, 1955 |
| 2,712,146 | Wise | July 5, 1955 |
| 2,772,435 | Louk | Dec. 4, 1956 |

FOREIGN PATENTS

| 1,085,363 | France | July 28, 1954 |